Dec. 12, 1939.  E. TRACHSEL  2,183,416
AUTOMATIC ADJUSTMENT FOR BRAKES
Filed Feb. 23, 1938  3 Sheets-Sheet 3
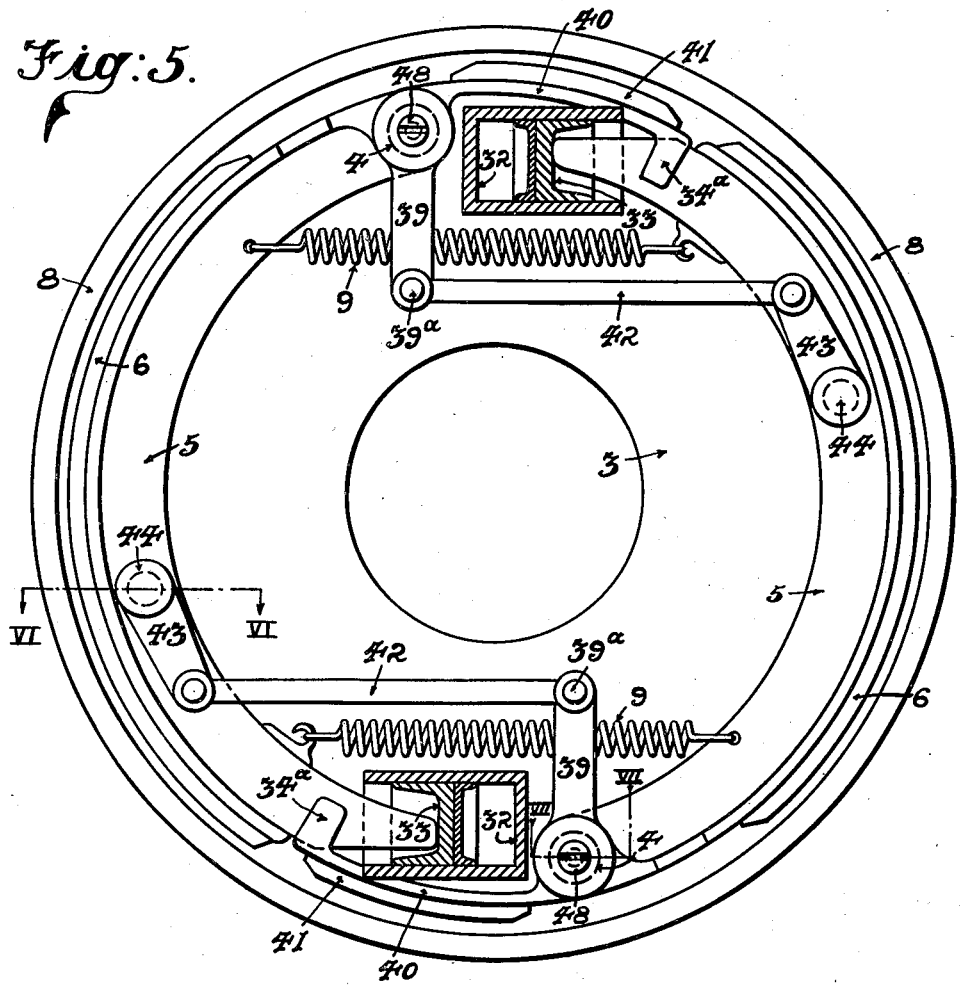
Fig:5.
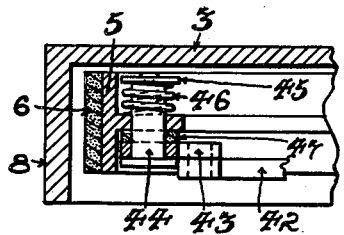
Fig:6.
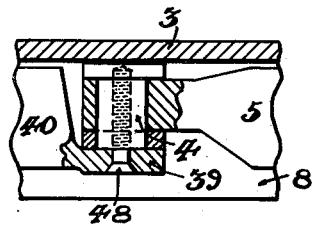
Fig:7.
Inventor:-
Ernst Trachsel
By His Attorney:-

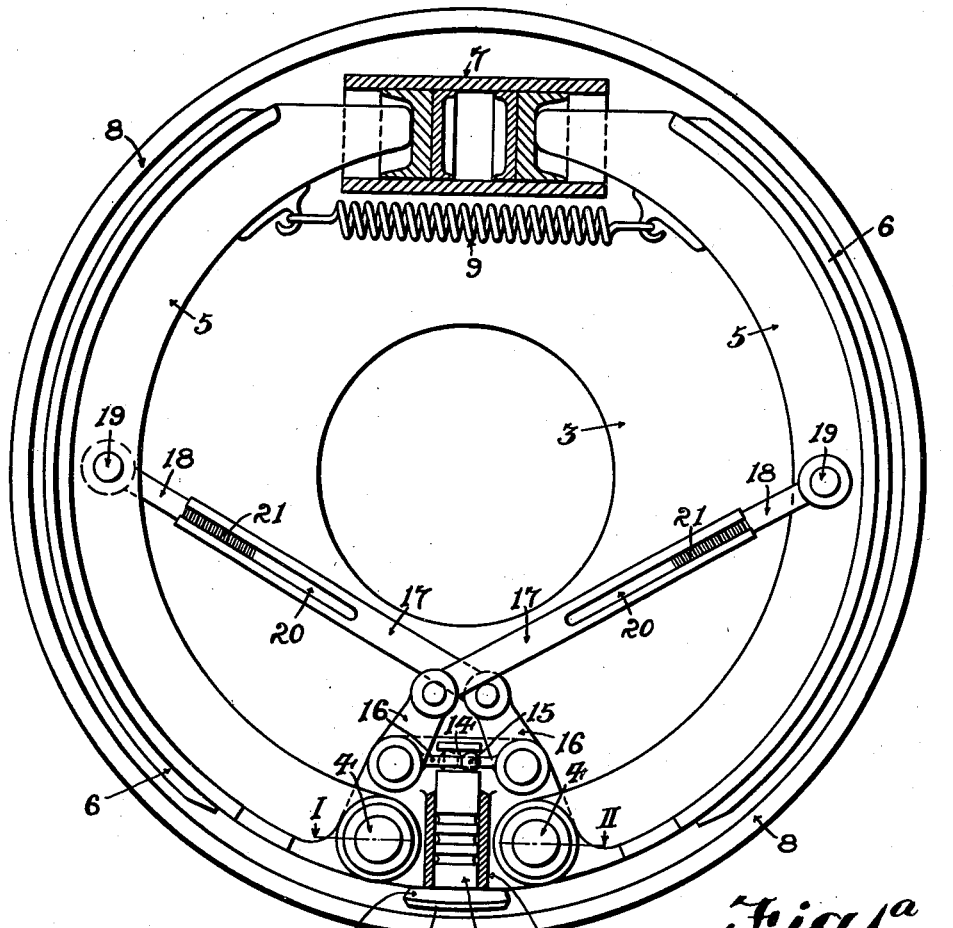
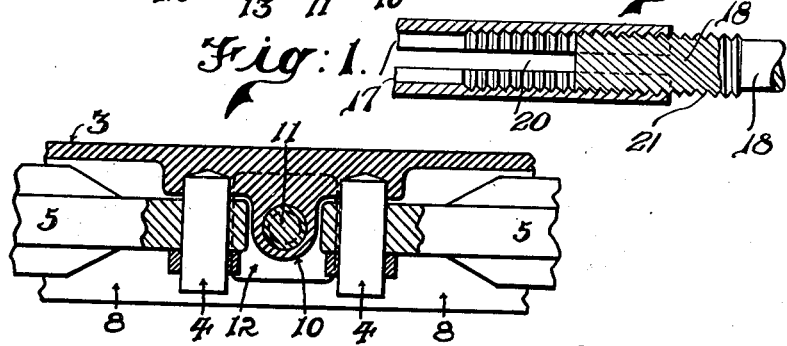

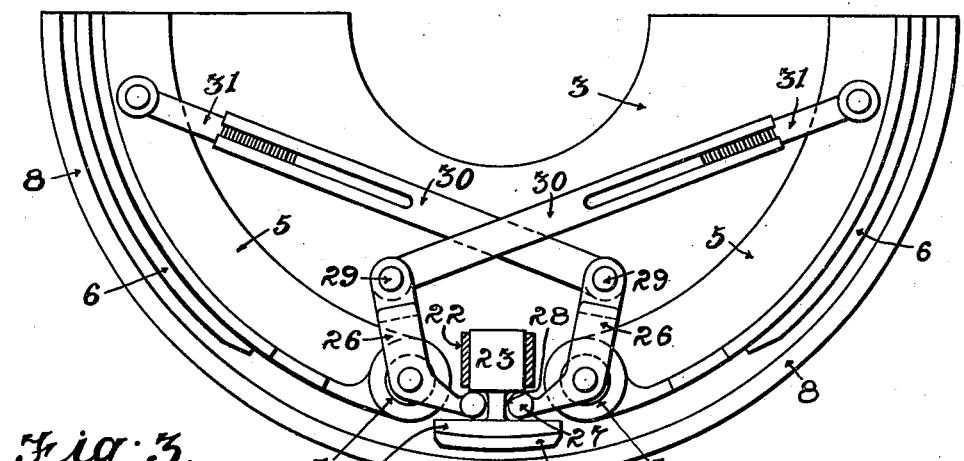
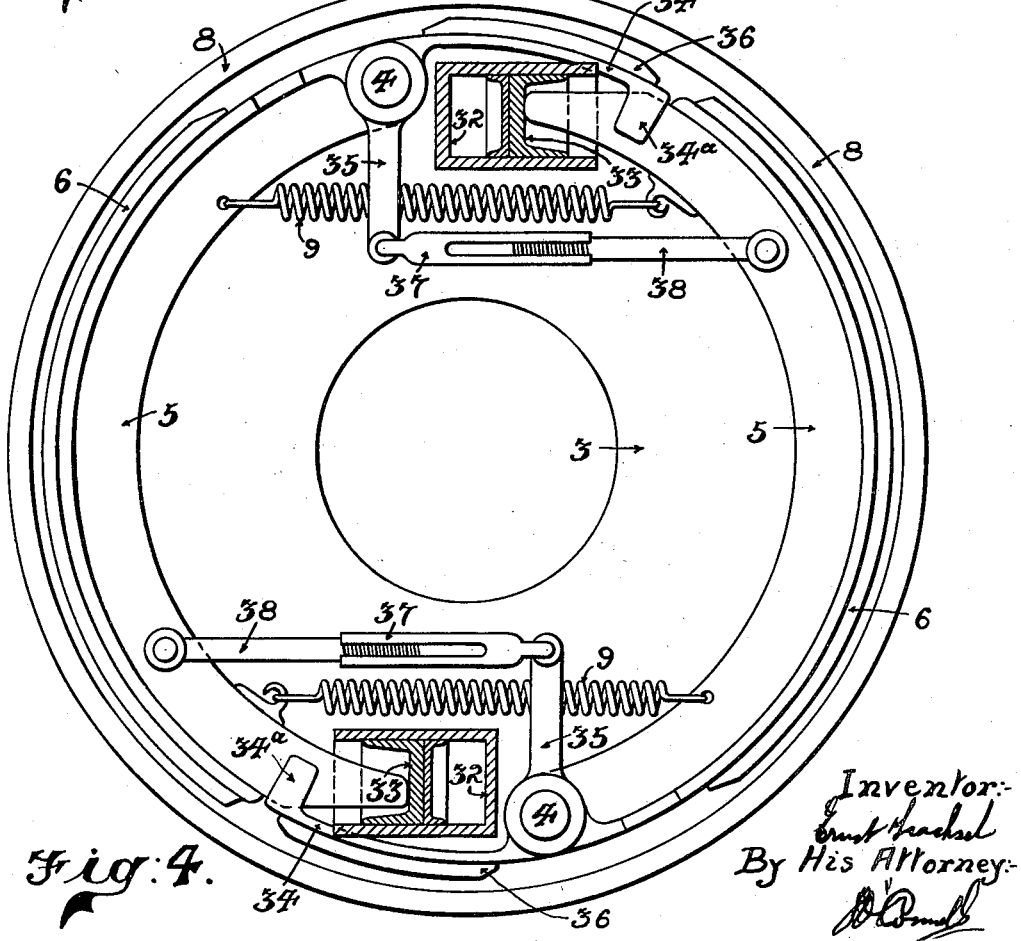

Patented Dec. 12, 1939

2,183,416

UNITED STATES PATENT OFFICE

2,183,416

AUTOMATIC ADJUSTMENT FOR BRAKES

Ernst Trachsel, Zurich, Switzerland, assignor of sixty per cent to Walther Huessy, Aarburg, Switzerland Application February 23, 1938, Serial No. 192,053 In Switzerland March 2, 1937

13 Claims. (Cl. 188—79.5)

REISSUED

JUN 3- 1941

The present invention relates to braking apparatus of the internal expanding type as employed in motor vehicles and more specifically to a means for effecting automatically the adjustment of brake blocks to compensate for wear of the linings of the same, so that the length of path of such brake blocks to cause their contact with the inner face of the usual brake drum for braking is rendered constant.

Many proposals have been made of mechanisms which, on the path of the brake blocks being exceeded on the braking stroke due to wear of brake linings, would cause a brake block to move back on brake release a little less distance than the length of its last forward or braking stroke. Whilst the consequent braking strokes have therefore the correct length of path, that path is itself moved forward towards the brake drum to leave the normal clearance space between drum and brake lining when the brakes are off. It is essential however to remember that a brake drum will on occasion expand due to heat generated in braking, and this expansion may extend to several millimetres increase of drum diameter, so that in these circumstances, as the brake blocks will adjust themselves in accordance with an increased length of braking path which is only temporarily established and is nullified when the brake drum shrinks again on cooling, the said brake blocks are liable to become jammed or the necessary clearance space between brake drum and brake lining will be rendered too narrow by such adjustment.

The objects of the present invention are, firstly, to provide a means for automatic brake adjustment which will allow for the conditions just set forth; secondly, to provide in combination with this a means for automatic adjustment of each of a pair of brake blocks separately in the one braking mechanism; and thirdly, to provide a mechanism for these purposes which will be reduced to the minimum as to number of parts and have the maximum of surety of operation and durability.

With these desirable objects in view the invention consists in the employment, in conjunction with a brake block, of a feeler member which is movable towards the brake drum, on braking movement of a brake block, to make contact with such drum, the length of the path of movement of the feeler member being equivalent to the normal length of braking movement path of the brake block. Adjusting means are provided between the brake block and the feeler member, this adjustment being so arranged that when through wear or other causes a brake block lining face does not in braking make contact with the brake drum at the same instant that the feeler member contacts with such drum, the excess of movement of the lining causes the adjustment means to adjust themselves and increase the effective distance between the feeler member and the brake block to which it is connected; the path of movement of the brake block is thus pro tanto moved towards the brake drum. Where a hard and prolonged braking has caused expansion of the brake drum, the point at which the adjusting means come into action will be delayed, as will be understood. For example, if a brake block is in perfect order with a new and unworn lining, both the face of the lining and the face of the feeler member will touch the expanded drum together and there is therefore no false adjustment of the path of the brake block.

This provision is in itself highly desirable and in fact essential, but it is also essential that any adjusting means for the purpose stated shall be of such a nature that there will be no "chattering" or danger of uneven working. The use of small and weak parts is also to be avoided, and to avoid these undesirable conditions I mount the means for connecting the adjusting member and the feeler member very strongly upon the backplate of the brake assembly. The anchorage pins of a pair of brake blocks may in fact be utilised to receive these connecting means, thus ensuring great strength, durability and firmness, resulting upon the mounting of the said means upon the backplate, and the saving of the provision of extra means for the purpose.

The invention may be applied indifferently to that form of internal expanding brake in which the brake shoes are anchored upon adjacent anchorage pins upon the backplate, both brake blocks being applied to the brake drum by means such as a hydraulic cylinder with pistons, which expand both brakes; and to a further form in which the brake blocks are pivotally anchored at opposed sides of the backplate, each being actuated by such means as a separate hydraulic cylinder and piston. Application of the invention to these two forms is shown in the annexed drawings, in which:

Figure 1 is an elevation of a brake assembly of the first mentioned type, Figure 2 being a cross section taken on line I—II of Figure 1;

Figure 1a is a detail in longitudinal section showing a form of adjusting means provided between a brake block and a feeler member;

Figure 3 is a fragmentary showing of the same form of brake in which the anchorage pins of the brake blocks are employed as bearings for the adjustment means;

Figure 4 is an elevation of the second above named type of brake with the adjustment means applied using the anchorage pins of the brake blocks.

Figure 5 is an elevation of a brake of the type shown in Figure 4 but having a modified form of adjusting means; and Figures 6 and 7 are cross-sections taken on lines VI—VI and VII—VII respectively of Figure 5.

Referring first to Figures 1, 1a and 2, a usual backplate is shown at 3 and it bears pivot pins 4 on which pivot the two brake shoes 5 having the linings 6, each shoe and its lining constituting a brake block. As in known practice in hydraulic brakes a double piston 7 serves to communicate the hydraulic power to the extremities of the brake shoes 5 to force them against the brake drum 8, the shoes being retracted on brake release by a usual form of spring indicated at 9. All these parts are known.

On the backplate 3 is fixed in any manner a form of tubular bracket 10 in which is slidably fitted a cylindrical metal member 11 having the enlarged head 12 which is faced with a facing 13 of extremely hard and durable brake lining which, as usual with brake block linings, may be riveted in place. This constitutes the feeler member, and near its upper extremity it is peripherally recessed at 14 to receive pins 15—one of which is shown—each of which is fixed in the end of an arm of a pivoted bellcrank lever 16, the extremity of the other arm of which bellcrank lever is articulated to a tubular member 17 in which fits a rod 18 which is at its outer extremity articulated to a brake shoe 5 at 19. The tubular members 17 are internally threaded and longitudinally slit as shown at 20, and an external thread 21 on each rod 18 engages the internal thread of its member 17. A pull upon a rod 18 therefore, the tubular member 17 resisting, will cause the rod and tubular member, considered as a whole, to extend and be retained in that condition, the said tubular member being laterally yieldable on such pull.

In operation the brake blocks are normally at a given distance from the brake drum 8 when the brakes are off. The feeler member face 13 is at substantially the same distance from the drum. On the brakes being applied, the feeler member facing 13 touches the drum, and the brake linings 6 make contact therewith, simultaneously, due allowance being made for any compressibility of the said linings under braking pressure. In course of time wear of a brake lining takes place, and this causes it to continue in its braking path after the feeler member facing has made contact with and been arrested by the brake drum. There is therefore a resistance to further movement of the tubular member 17 of the block, and the rod 18 is drawn out to an extent equal to the excess movement of such brake block. That is to say, when a lining wears to a degree equal to the pitch of the thread 21, the rod 18 and tubular member 17 are extended to that degree. The use of the feeler member ensures that no adjustment of a brake block can be effected unless it exceeds the path of movement of the feeler member, whatever may be the diameter of the brake drum, either normal or temporarily extended.

It will be understood that the facing 13 of the feeler member should be of such a nature that it will not participate in the wear of the brake linings 6, as in that case no result would be attained. It should therefore be extremely hard and resistant to wear in the conditions prevailing, but it will be noted that whereas the brake linings 6 are subjected at every braking to the usual high frictional and wearing effect, there is no positive pressure applied to the feeler member at any time to press it upon the drum except the slight pressure necessary to hold a tubular member 17 against the pull of a rod 18 as extension between these takes place. At all braking periods between adjustment movements the contact of the facing 13 of the feeler member upon the brake drum may be so finely adjusted that it is a mere touch.

In Figure 3 the assembly is substantially as shown in Figure 1 with the exception of the fact that the anchorage pin of one brake block is employed as the means for mounting the connecting means between the feeler and the other brake block. As before, there are a tubular bracket 22 with the slidable metal member 23 having the head 24 and the hard and durable lining 25, and upon each anchorage pin 4 is pivotally mounted a bellcrank lever 26 which at 27 engages by one of its arms with the recess 28 in the member 23, the other arm of each bellcrank lever being articulated at 29 to the adjusting member 30—31 articulated to a brake block.

It will be noted that in the forms above described one feeler member is sufficient for the purpose of adjusting two brake blocks, as each block is provided with its adjusting member engaging with a feeler member common to both.

Figure 4 illustrates another form of brake in which the anchorage pins of the brake blocks 5 are utilised, these pins being however in this form on opposite ends of a diameter and each brake block being forced towards the brake drum in braking, by a separate hydraulic cylinder 32 and piston 33. Upon each anchorage pin 4 is pivotally fitted in addition to the brake block, a bellcrank lever 34—35 of which one arm 34 is faced with the hard and durable lining 36, this arm constituting the feeler member. To the free end of the other arm of each bellcrank lever is articulated one extremity of the adjusting member 37—38 of the form shown at 17—18 in Figure 1. Each lever arm 34 terminates in a bifurcated end 34a which embraces the end of a brake shoe 5, thus serving to position the bellcrank lever 34—35 in the released or "brakes off" position, any adjustment of its brake block not affecting the length of the path of movement of the feeler. The operation is as before described, only an excess of length of path of movement of either brake block over that of the feeler member causing adjustment.

In the form of adjustment shown in Figure 5 there is provided the bellcrank lever 39—40 with the facing 41 on one arm thereof, this arm forming the feeler, and each lever 39—40 is provided upon an anchorage pin 4. To the outer end 39a of each arm 39 of a lever 39—40 is articulated the rod 42 which at its other end is articulated to an arm 43 pivoted upon brake shoe 5 by means of the pivot pin 44. As shown in Figure 6 each such pivot pin 44 passes through the web of a brake shoe 5 and bears a metal washer 45 into which the free end of such pin is riveted, a strong compression spring 46 being interposed between the washer 45 and the brake shoe web. A further washer 47, formed of hard and durable frictional material—the material employed for the feeler facing is suitable—is mounted upon the pivot pin 44 as shown in the figure.

In the operation of the brake according to Figure 5, assuming that the extent of movement of a brake shoe 5 to effect braking exceeds the extent of movement of the feeler arm 40 towards the brake drum 8, the obtuse angle formed by rod 42 and the arm 43 increases, thus increasing the effective length or distance between centres of pivot pin 44 and the articulation 39a. The frictional washer 47 presents a strong resistance to this movement but the said movement is effected by the strong braking pressure and the arm 43 duly yields to the required extent, the adjustment of the brake being thus simply effected. On release of the brakes the parts 39—40 and 42 return to their original positions as shown in Figure 5, but as the angle formed by arm 43 has been increased it remains in that condition, there being no force to cause it to change on the backward or release movement of the parts. The adjusted effective length between pivot pin 44 and articulation 39a thus remains adjusted until a further adjustment of the brakes towards the brake drum is required. This form of adjustment may be equally well applied in Figures 1, 3, and 4 in substitution of the extensible adjustment members therein shown.

Although any mechanical means may be employed for the mounting of a bellcrank lever 39—40 upon an anchorage pin, the means shown in detail in Figure 7 are found useful. The brake shoe 5 is mounted to pivot upon the pin 4 cast on the backplate 3 and a screw 48 serves to secure the arm 39 of the bellcrank lever 39—40 which is connected to the arm 40 as shown. This provides a simple and effective means of applying the adjustment means of this invention to an existing brake assembly, and as will be understood may be equally well applied to the mounting of the bellcrank lever 26 of Figure 3 or the bellcrank lever 34—35 of Figure 4.

Whilst I have shown and described the simplest and most accurately operating methods known to me of carrying out the invention it will be understood that I do not confine myself to the precise details and arrangement of the parts, which may be varied within the scope of the description and of the following claims:

I claim:

1. In a brake assembly, a feeler member mounted upon the brake backplate and movable towards the brake drum in a length of path equivalent to the normal length of path of a brake block in braking, an adjusting member adjustable as to effective length under tension and connected to the brake block, and means mounted upon the brake backplate adapted to transmit the motion of the brake block through the adjustment member to the feeler member, until the latter makes contact with the brake drum.

2. In a brake assembly, a feeler member mounted upon the brake backplate and movable towards the brake drum in a length of path equivalent to the normal length of path of a brake block in braking, an adjusting member extensible in its effective length under tension connected at one end to the brake block, and a bellcrank lever pivoted upon a pin in the brake backplate and having one arm thereof connected to the other end of the adjusting member, the other arm of the bellcrank lever engaging the feeler member and transmitting thereto bodily motion of the brake block and adjusting member.

3. In a brake assembly having two brake blocks, a feeler member mounted upon the brake backplate and slidably movable towards the brake drum in a length of path equivalent to the normal length of path of a brake block in braking, an adjusting member adjustable as to effective length under tension and connected to one brake block, and a bellcrank lever pivoting upon a pivot point constituted by an anchorage pin of the brake block other than that to which the adjusting member is connected, the said adjusting member and the feeler member being connected by the bellcrank lever.

4. In a brake assembly having two brake blocks pivoted upon anchorage pins at opposite points upon the brake backplate, with means for impelling each brake block separately towards the brake drum, two feeler members mounted upon the backplate and each movable towards the brake drum, in a length of path equivalent to the normal length of path of a brake block in braking, an adjusting member connected to each brake block, and means mounted upon the backplate adapted to transmit braking motion of each brake block through its adjusting member to its feeler member.

5. In a brake assembly having two brake blocks pivoted upon anchorage pins at opposed points upon the brake backplate, with means for impelling each brake block towards the brake drum, two feeler members mounted upon the backplate and each movable towards the brake drum in a length of path equivalent to the normal length of path of a brake block in braking, an adjusting member adjustable as to effective length under tension connected to each brake block, and means mounted upon the backplate adapted to transmit braking motion of each brake block through the adjusting member to its feeler member.

6. In a brake assembly having two brake blocks pivoting upon anchorage pins at opposed points upon the brake backplate, with means for impelling each brake block towards the brake drum, two feeler members each movable towards the brake drum in a length of path equivalent to the normal length of path of a brake block in braking, a bellcrank lever pivoted upon an anchorage pin of each brake block, one arm of each bellcrank lever bearing a hard brake lining and constituting the feeler member, and an adjusting member connected to each brake block and to an arm of the bellcrank lever pivoted upon the anchorage pin of the other brake block.

7. In a brake assembly having two brake blocks pivoting upon anchorage pins at opposed points upon the brake backplate, with means for impelling each brake block towards the brake drum, two feeler members each movable towards the brake drum in a length of path equivalent to the normal length of path of a brake block in braking, a bellcrank lever pivoted upon an anchorage pin of each brake block, one arm of each bellcrank lever bearing a hard brake lining and constituting the feeler member, and an adjusting member, adjustable as to effective length under tension, connected to each brake block and to an arm of the bellcrank lever pivoted upon the anchorage pin of the other brake block.

8. In a brake assembly a pair of brake blocks, a feeler member mounted upon the backplate of the brake and slidably movable towards the brake drum in a length of path equivalent to the normal length of path of each brake block, an adjusting member connected to each brake block, bellcrank levers pivoting upon the brake backplate, one arm of each lever being connected to said adjusting member, and engaging means upon the feeler member which means are engaged by and receive motion from the other arms of the bellcrank levers.

9. In a brake assembly, a feeler member mounted upon the brake backplate and movable towards the brake drum in a length of path equivalent to the normal length of path of a brake block in braking, a two-part articulated adjusting member connected at one end to the brake block, friction means between such end and such brake block, and a bellcrank lever pivoted upon a pin in the brake backplate, the other end of the two-part adjusting member being connected to an arm of said bellcrank lever, the other arm of the bellcrank lever carrying the feeler member.

10. In a brake assembly having two brake blocks pivoting upon anchorage pins at opposed points upon the brake backplate, with means for impelling each brake block towards the brake drum, two feeler members each movable towards the brake drum in a length of path equivalent to the normal length of path of a brake block in braking, a bellcrank lever pivoted upon an anchorage pin of each brake block, one arm of each bellcrank lever bearing a hard brake lining and constituting the feeler member, and an adjusting member consisting of a longitudinally extensible two-part member connected to each brake block and to an arm of the bellcrank lever pivoted upon the anchorage pin of the other brake block.

11. In a brake assembly having two brake blocks pivoting upon anchorage pins at opposed points upon the brake backplate, with means for impelling each brake block towards the brake drum, two feeler members each movable towards the brake drum in a length of path equivalent to the normal length of path of a brake block in braking, a bellcrank lever pivoted upon an anchorage pin of each brake block, one arm of each bellcrank lever bearing a hard brake lining and constituting the feeler member, and an adjusting member consisting of an articulated two-part member connected to each brake block and to an arm of the bellcrank lever pivoted upon the anchorage pin of the other brake block, and friction means between each brake block and its connected end of the two-part member.

12. In a brake assembly having two brake blocks and a further member serving as a feeler member, all having equivalent lengths of path of movement towards the brake drum when the brake blocks are unworn, means for imparting the movement of each brake block separately to the feeler member, such means being changeable as to form on excess movement of either brake block occurring as a result of its wear over the length of movement of the feeler member, for the purpose set forth.

13. In a brake assembly having two brake blocks and two members serving as feeler members, all having equivalent lengths of path of movement towards the brake drum when the brake blocks are unworn, connecting means between each brake block and a feeler member which means impart movement of a brake block to its connected feeler member, such connecting means being changeable as to form on excess movement of a brake block occurring as a result of its wear over the length of movement of its so connected feeler, for the purpose set forth.

ERNST TRACHSEL.